United States Patent
Wang (10) Patent No.: US 12,557,008 B2
(45) Date of Patent: Feb. 17, 2026

(54) CARD-TRANSFER SLICE SWITCHING METHOD, DEVICE AND STORAGE MEDIUM

(71) Applicant: ZTE CORPORATION, Shenzhen (CN)

(72) Inventor: Cheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 457 days.

(21) Appl. No.: 18/041,456

(22) PCT Filed: Jun. 16, 2021

(86) PCT No.: PCT/CN2021/100410
§ 371 (c)(1),
(2) Date: Feb. 13, 2023

(87) PCT Pub. No.: WO2022/041954
PCT Pub. Date: Mar. 3, 2022

(65) Prior Publication Data
US 2023/0300732 A1    Sep. 21, 2023

(30) Foreign Application Priority Data

Aug. 27, 2020   (CN) .......................... 202010881130.6

(51) Int. Cl.
*H04W 48/18*   (2009.01)
*H04W 24/08*   (2009.01)
*H04W 36/16*   (2009.01)

(52) U.S. Cl.
CPC ........... *H04W 48/18* (2013.01); *H04W 24/08* (2013.01); *H04W 36/16* (2013.01)

(58) Field of Classification Search
CPC ........ H04L 12/00; H04L 47/00; H04W 24/02; H04W 24/08; H04W 28/0268;
(Continued)

(56) References Cited

U.S. PATENT DOCUMENTS 10,517,037 B2 * 12/2019 Liu ........................ H04W 48/16
12,232,020 B2 *  2/2025 Foti ....................... H04W 48/00
(Continued)

FOREIGN PATENT DOCUMENTS

CN        107040481 A    8/2017
CN        109155961 A    1/2019
(Continued)

OTHER PUBLICATIONS

3GPP Technical Specification Group Radio Access Network. "Overview of Rel-17 work areas for NR and LTE," 3GPP TSG RAN Meeting #84, Jun. 2019, pp. 1-22.
(Continued)

*Primary Examiner* — Mong-Thuy T Tran
(74) *Attorney, Agent, or Firm* — Vivacqua Crane, PLLC (57) ABSTRACT

A card-transfer slice switching method, a device and a storage medium are disclosed. The card-transfer slice switching method may include: acquiring a card-transfer slice switching signal (S1000); obtaining a switchable slice according to the card-transfer slice switching signal, an application network usage status of a current card and a preset slice database, the slice database including matching information between the application network usage status and the switchable slice of a target card to be transferred to (S2000); and, performing card-transfer slice switching according to the switchable slice (S3000).

20 Claims, 5 Drawing Sheets

(58) Field of Classification Search
CPC . H04W 48/18; H04W 74/0866; H04W 36/16; H04W 36/22
See application file for complete search history.

(56) References Cited

U.S. PATENT DOCUMENTS

| | | | |
|---|---|---|---|
| 2011/0098046 A1* | 4/2011 | Shin | H04W 48/16 455/436 |
| 2014/0105592 A1 | 4/2014 | Kataria et al. | |
| 2017/0325134 A1* | 11/2017 | Wan | H04W 48/16 |
| 2019/0261187 A1 | 8/2019 | Chen et al. | |
| 2020/0045767 A1 | 2/2020 | Velev et al. | |
| 2020/0077268 A1* | 3/2020 | Seshadri | H04L 63/1458 |
| 2021/0203581 A1* | 7/2021 | He | H04L 43/0882 |
| 2021/0368327 A1 | 11/2021 | Gao | |
| 2022/0201569 A1* | 6/2022 | Horita | H04W 48/18 |
| 2023/0023278 A1* | 1/2023 | Foti | H04W 48/00 |
| 2023/0094040 A1* | 3/2023 | Sun | H04W 48/20 455/436 |

FOREIGN PATENT DOCUMENTS

| | | | | |
|---|---|---|---|---|
| CN | 109951440 A | 6/2019 | | |
| CN | 110267314 A | 9/2019 | | |
| CN | 111343686 A | 6/2020 | | |
| CN | 111580996 A | 8/2020 | | |
| CN | 111935788 B * | 5/2025 | | H04W 36/13 |
| EP | 3949471 B1 * | 2/2025 | | H04L 47/11 |
| EP | 3750335 B1 * | 3/2025 | | H04W 60/00 |
| WO | 2019231275 A1 | 12/2019 | | |

OTHER PUBLICATIONS

The State Intellectual Property Office of People's Republic of China. First Office Action for CN Application No. 202010881130.6 and English translation, mailed Jul. 16, 2024, pp. 1-10.

The State Intellectual Property Office of People's Republic of China. Search Report for CN Application No. 202010881130.6 and English translation, mailed Jul. 12, 2024, pp. 1-6.

European Patent Office. Extended European Search Report for EP Application No. 21859798.7, mailed Jan. 23, 2024, pp. 1-11.

Intellectual Property India. Examination Report for IN Application No. 202327011114 and English translation, mailed Feb. 6, 2024, pp. 1-8.

International Searching Authority. International Search Report and Written Opinion for PCT Application No. PCT/CN2021/100410 and English translation, mailed Jul. 28, 2021, pp. 1-9.

* cited by examiner

FIG. 11

CARD-TRANSFER SLICE SWITCHING METHOD, DEVICE AND STORAGE MEDIUM

CROSS-REFERENCE TO RELATED APPLICATION

This application is a national stage filing under 35 U.S.C. § 371 of international application number PCT/CN2021/100410, filed Jun. 16, 2021, which claims priority to Chinese patent application No. 202010881130.6 filed on Aug. 27, 2020. The contents of these applications are incorporated herein by reference in their entirety.

TECHNICAL FIELD

The embodiments of the present disclosure relate to, but not limited to, the technical field of wireless communication, in particular to a card-transfer slice switching method, a device and a storage medium.

BACKGROUND

In the simplest sense, network slicing is to slice a physical network into a plurality of virtual end-to-end networks. Each virtual network (including the devices, access, transmission and core network in the network) is logically independent, and the failure of any virtual network will not affect other virtual networks. Each virtual network has different functional characteristics, and faces different demands and services.

At present, all terminal devices have only one set of radio frequency, so data services can select only one card for residence. During card-transfer switching, the terminal devices with a multi-card multi-standby function cannot realize the switching from the slice of the current card to the slice of the target card to be transferred. For example, a dual-card dual-standby mobile phone in the market can only select one card for residence. As is often found in the current network, if card 1 and card 2 do not belong to the same operator, the signals will be different. If the card-transfer slice of card 1 is directly switched to a slice of card 2, since the available slice services obtained by card 1 and card 2 are different, it is impossible to realize the switching from the slice of card 1 to the slice of card 2, resulting in low quality of the slice connection service.

SUMMARY

The embodiments of the present disclosure provide a card-transfer slice switching method, a device and a storage medium.

In accordance with an aspect of the present disclosure, an embodiment provides a card-transfer slice switching method. The method may include: acquiring a card-transfer slice switching signal; obtaining a switchable slice according to the card-transfer slice switching signal, application network usage status of a current card and a preset slice database, the slice database including matching information between the application network usage status and the switchable slice of a target card to be transferred to; and, performing card-transfer slice switching according to the switchable slice.

In accordance with an aspect of the present disclosure, an embodiment provides an electronic device. The device may include: a memory, a processor and a computer program stored on the memory and executable by the processor which, when executed by the processor, causes the processor to implement the card-transfer slice switching method described above.

In accordance with an aspect of the present disclosure, an embodiment provides a computer-readable storage medium, storing a computer-executable instruction which is used for performing the card-transfer slice switching method described above.

Other features and advantages of the present disclosure will be illustrated in the following description, and will partially become apparent from the description or be understood by practicing the present disclosure. The objectives and other advantages of the present disclosure can be achieved and obtained by the structures specified in the description, the claims and the accompanying drawings.

BRIEF DESCRIPTION OF DRAWINGS

The accompanying drawings are provided for further understanding of the technical schemes of the present disclosure and constitute a part of the description. The accompanying drawings are used with the embodiments of the present disclosure to illustrate the technical schemes of the present disclosure, and are not intended to limit the technical schemes of the present disclosure.

DETAILED DESCRIPTION

To make the objectives, technical schemes and advantages of the present disclosure clear, the present disclosure will be further described below in detail by way of embodiments in conjunction with the accompanying drawings. It should be understood that the specific embodiments described herein are merely for illustrating the present disclosure, and are not intended to limit the present disclosure. The embodiments in the present disclosure and the features in the embodiments may be arbitrarily combined with each other if not in confliction.

It is to be noted that, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second", "third" and "fourth" in the description, the claims, and the accompanying drawings are used to distinguish between similar objects, and are not necessarily used to describe a specific sequence or a precedence order.

Network slicing is to slice a physical network into a plurality of virtual end-to-end networks. Each virtual network (including the devices, access, transmission and core network in the network) is logically independent, and the failure of any virtual network will not affect other virtual networks. Each virtual network has different functional characteristics, and faces different demands and services. The network slicing brings about the following benefits: the quality of different levels of services is ensured, including conventional network indicators such as bandwidth, latency, packet loss and jitter, so that a user can obtain a logically independent networks, avoiding network risks and leaks, and the user can view the network statistical indicators and statuses related to his/her own slice set.

When a terminal device performs network registration (e.g., 5G network registration), it may negotiate with the network or the network provides Network Slice Selection Assistance Information (NSSAI) of a slice set to obtain slice related information. The slice related information includes the Data Network Names (DNNs) in slices. The terminal device contains a UE Route Selection Policy (URSP), and the URSP contains a Network Slice Selection Policy (NSSP). The applications in the terminal device select slices according to the NSSP. Elements in the NSSP include DNN, application ID, and the like, and the applications can select the elements in the NS SP to match the NSSP. The operator may preconfigure the URSP for the UE, or the URSP may be dynamically issued or updated by the PCF.

Since conventional terminal devices have only one set of radio frequency modules, a data service intelligently selects a card (e.g., a SIM card, a baiMicro-SIM card or a Nano-SIM card, etc.) for residence. As is often found in the current network, if any two cards in the terminal device do not belong to the same operator, the network signals corresponding to the two cards are different. It is assumed that a certain application uses a slice on a current card and the current card needs to be switched to a target card to be transferred to. Since the slice set of the current card is different from that the slice set of the target card to be transferred to, after the current card is switched to the target card to be transferred to, the slice used by the application is switched to a corresponding slice on the target card to be transferred to. As a result, it is impossible to switch the slice used by the application from the current card to the target card to be transferred to, so that the use of the application by the user will be affected to a certain extent and the slice connection service quality is reduced.

On this basis, the embodiments of the present disclosure provide a card-transfer slice switching method, a device and a storage medium, which can realize the switching of a slice from a current card to a target card to be transferred to without affecting the use of an application by a user and can improve the slice connection service quality.

Figure 1:
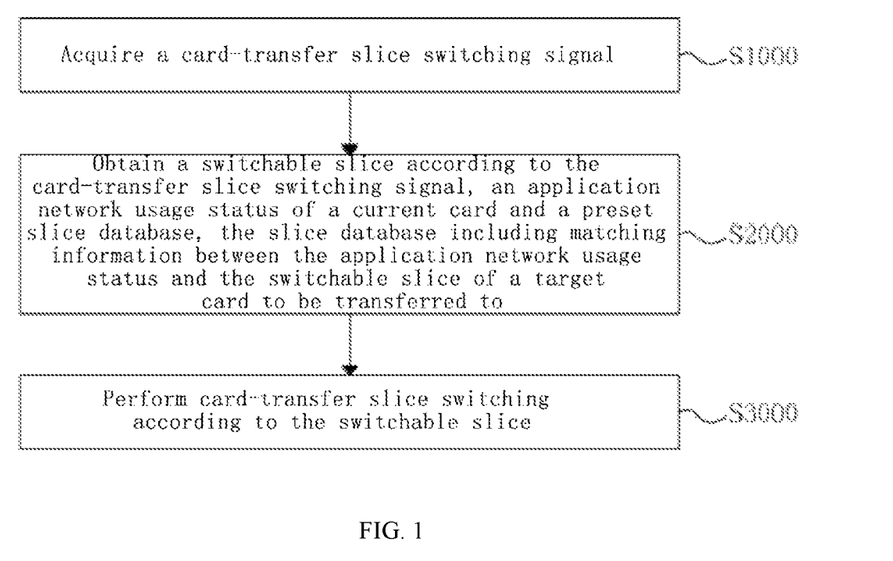
FIG. 1 is a flowchart of a card-transfer slice switching method according to an embodiment of the present disclosure.

In an aspect, with reference to FIG. 1, an embodiment of the present disclosure provides a card-transfer slice switching method. The method includes the following steps S1000 to S3000.

At S1000, a card-transfer slice switching signal is acquired.

At S2000, a switchable slice is obtained according to the card-transfer slice switching signal, an application network usage status of a current card and a preset slice database, where the slice database includes matching information between the application network usage status and the switchable slice of a target card to be transferred to.

At S3000, card-transfer slice switching is performed according to the switchable slice.

In some embodiments, after the terminal device completes the network registration of the current card and the target card to be transferred to, slice sets supported by the current card and the target card to be transferred to are obtained separately in the network registration signaling interaction process. The slice sets of the current card and the target card to be transferred to are compared to acquire slices of the current card and the target card to be transferred to according to the matching information so as to obtain a switchable slice, and the switchable slice is stored in the slice database.

When the card-transfer slice switching signal is received, the switchable slice is obtained according to the card-transfer slice switching signal, the application network usage status of the current card and the preset slice database. Since slicing is an application technology of the 5G network, if the current card belongs to any one of 2G, 3G and 4G networks while the target card to be transferred to belongs to a 5G network, no slice is used on the current card, and a switchable slice (i.e., a slice that can be used by the application after switching from the current card to the target card to be transferred to) is obtained according to the card-transfer slice switching signal and the preset slice database. If both the current card and the target card to be transferred to belong to a 5G network and the application network usage status of the current card is equivalent to the slice used by the application of the current card, a switchable slice is obtained according to the matching information between the application network usage status of the current card and the switchable slice of the target card to be transferred to. That is, card-transfer slice switching can be performed according to the switchable slice. Thus, during the switching from the current card to the target card to be transferred to, slice switching from the current card to the target card to be transferred to is performed, so that the use of the application by the user will not be affected, and the slice connection service quality can be improved.

In some embodiments, the slice database includes a switchable slice database and a replaceable slice database. The switchable slice database includes matching information between slices with a same traffic descriptor in the current card and the target card to be transferred to; and/or, the replaceable slice database includes matching information between slices with matched replacement parameters in the current card and the target card to be transferred to.

The traffic descriptor is a set of traffic parameters used for describing the traffic characteristics of an IP flow on a given standard interface. The traffic descriptor includes, but not limited to, a data network name, an application ID, an IP-3 Tuple, and a Non-IP descriptor. After the current card and the target card to be transferred to have completed network registration, the current card and the target card to be transferred to will acquire slice sets. Then, the slice set of the current card and the slice set of the target card to be transferred to are analyzed, and matching information between slices with a same traffic descriptor in the current card and the target card to be transferred to is stored into the switchable slice database. Then, the matching information between slices with matched replacement parameters in the current card and the target card to be transferred to is searched for from the remaining slices and stored into the replaceable slice database. Because the matching information between slices with a same traffic descriptor in the current card and the target card to be transferred to is stored in the switchable slice database and the matching information between slices with matched replacement parameters in the current card and the target card to be transferred to is stored in replaceable slice database, it is convenient to obtain the switchable slices in a different database according to the application network usage status of the current card, and the slice used by the application on the target card to be transferred to more closely matches the slice used by the application on the current card after the current card is switched to the target card to be transferred to.

In some embodiments, the replacement parameter includes at least one of a Quality of Service (QoS) parameter, a bandwidth parameter or a delay parameter.

Since the switchable slice database includes the matching information between slices with a same traffic descriptor in the current card and the target card to be transferred to, the slices in the switchable slice database can be removed from the slice sets of the current card and the target card to be transferred to, to obtain the remaining slices, and the replaceable slice database includes the matching information between slices with matched replacement parameters selected from the remaining slices. By screening out the slices with matched QoS parameter and/or bandwidth parameter and/or delay parameter in the remaining slices, the matching information between slices in the replaceable slice database is obtained.

Figure 2:
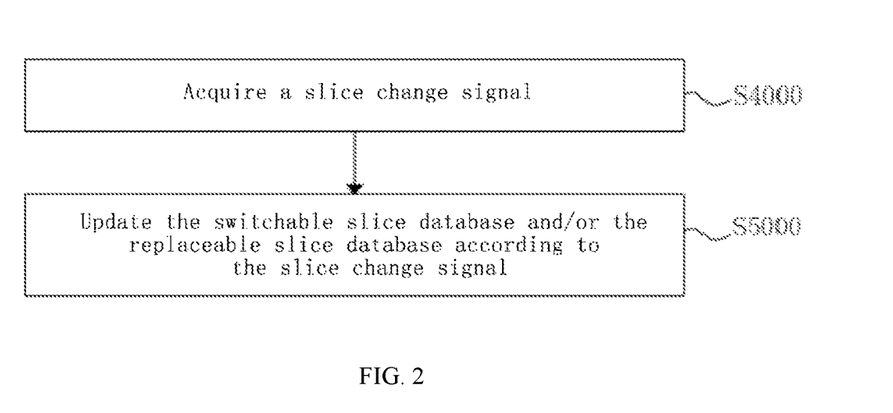
FIG. 2 is a flowchart of a card-transfer slice switching method according to another embodiment of the present disclosure.

In some embodiments, with reference to FIG. 2, the card-transfer slice switching method further includes the following steps S4000 to S5000.

At S4000, a slice change signal is acquired.

At S5000, the switchable slice database and/or the replaceable slice database are/is updated according to the slice change signal.

During the operation of the terminal device, the application network usage status of the current card is varying, so the slice used by the current card varies. A slice change message is subscribed through a wireless protocol stack to obtain a slice change signal. If the slice set of the current card is changed, a slice change signal is acquired, and the switchable slice database and/or the replaceable slice database are/is updated according to the slice change signal, such that a more accurate switchable slice can be obtained by utilizing the updated switchable slice database and the replaceable slice database.

Figure 3:
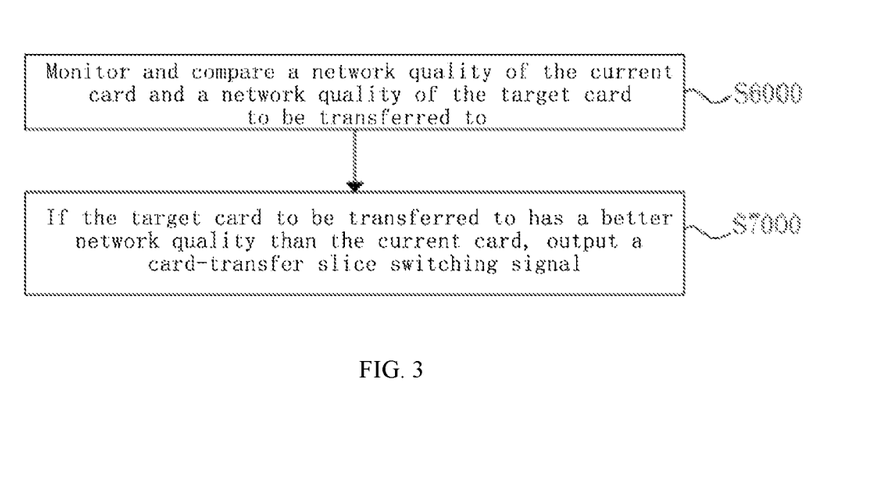
FIG. 3 is a flowchart of a card-transfer slice switching method according to another embodiment of the present disclosure.

In some embodiments, with reference to FIG. 3, the card-transfer slice switching method further includes the following steps S6000 to S7000.

At S6000, the network quality of the current card and the network quality of the target card to be transferred to are monitored and compared.

At S7000, if the target card to be transferred to has a better network quality than the current card, the card-transfer slice switching signal is output.

By monitoring and comparing the network quality of the current card and the network quality of the target card to be transferred to, if the target card to be transferred to has a better network quality than the current card, the card-transfer slice switching signal is output. By automatically monitoring the network quality of the current card and the network quality of the target card to be transferred to, the switching between the current card and the target card to be transferred to is automatically realized, so that the manpower can be saved and the best network quality of the current application can be maintained at all times. There are at least two subscriber identity cards in the terminal device. A currently used subscriber identity card is the current card, and a subscriber identity card with the best network quality among subscriber identity cards other than the current card in the terminal device is the target card to be transferred to. Thus, other subscriber identity cards are monitored and compared in terms of the network quality to select a subscriber identity card with the best network quality as the target card to be transferred to, and the target card to be transferred to and the current card are then monitored and compared. Only if the target card to be transferred to has a better network quality than the current card, the card-transfer slice switching signal is output, and card transfer is performed according to the card-transfer slice switching signal, such that an optimal network quality of the subscriber identity card used by the terminal device is maintained and the user experience is improved.

In other embodiments, the card-transfer slice switching signal is output by clicking a card-transfer switching key by the user, that is, the current card is manually switched to the target card to be transferred to. Then, a switchable slice is obtained according to the card-transfer slice switching signal, the application network usage status of the current card and the preset slice database, and card-transfer slice switching is performed according to the switchable slice. By manually switching the current card to the target card to be transferred to, both the network quality of the target card to be transferred to and the network quality of the current card will not be taken into consideration, and the target card to be transferred to is the subscriber identity card selected to be transferred to by the user. By manually switching the current card to the target card to be transferred to, it is convenient to transfer the subscriber identity card according to the user's needs.

In some embodiments, the network quality includes at least one of a Reference Signal Received Power (RSRP), a Reference Signal Received Quality (RSRQ), a Signal-to-Noise Ratio (SNR), a bandwidth, a network type and a network congestion. Monitoring and comparing the network quality of the current card and the network quality of the target card to be transferred to includes monitoring and comparing any at least one of the RSRP, RSRQ, SNR, bandwidth, network type and network congestion of the current card and the target card to be transferred to. If the value of any one of the RSRP, RSRQ and SNR of the current card is less than a preset threshold or the bandwidth is too low to meet the quality of slice service or the network type is a non-5G network or a network congestion occurs, but the RSRP, RSRO or SNR of the target card to be transferred to is higher than that of the current card and the bandwidth and network type of the target card to be transferred to meet the quality of slice service, the card-transfer slice switching signal is output. Monitoring and comparing the network quality of the current card and the network quality of the target card to be transferred to includes monitoring and comparing at least one of the RSRP, RSRQ, SNR, bandwidth, network type and network congestion of the current card and the target card to be transferred to, so as to accurately output the card-transfer slice switching signal after the network quality of the current card and the network quality of the target card to be transferred to are determined more accurately.

Figure 4:
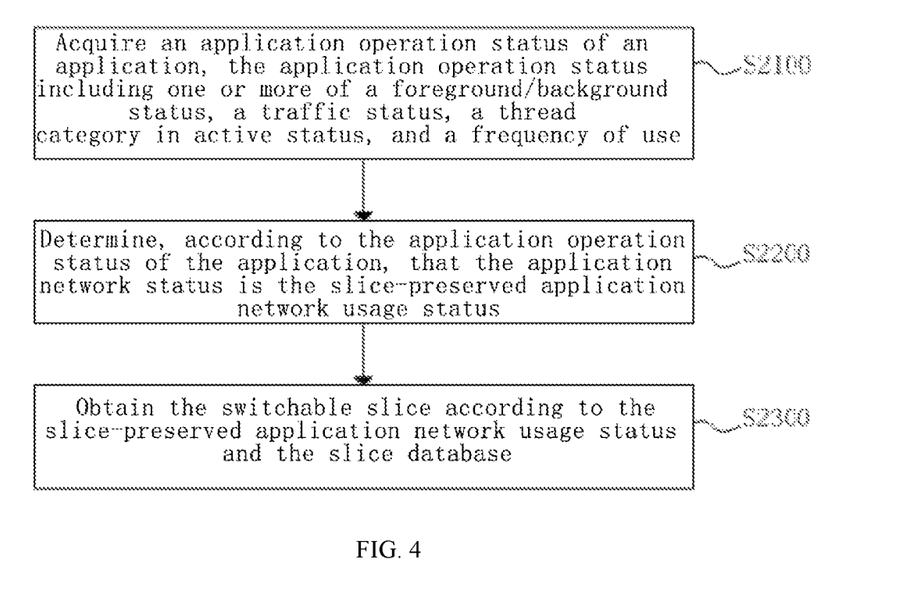
FIG. 4 is a flowchart of a card-transfer slice switching method according to another embodiment of the present disclosure.

In some embodiments, with reference to FIG. 4, the application network usage status includes a slice-preserved application network usage status and a slice-unpreserved application network usage status.

Obtaining a switchable slice according to the card-transfer slice switching signal, the application network usage status of a current card and a preset slice database includes the following steps S2100 to S2300.

At S2100, an application operation status of an application is acquired, where the application operation status includes at least one of a foreground/background status, a traffic status, a thread category in active status, and a frequency of use.

At S2200, a determination is made according to the application operation status of the application that the application network usage status is the slice-preserved application network usage status.

At S2300, a switchable slice is obtained according to the slice-preserved application network usage status and the slice database.

During the operation of the terminal device, real-time monitoring is performed on the application operation status of the application, mainly at least one of the foreground/background status, the traffic status, the thread category in active status and the frequency of use of the application, to determine that the application network usage status is the slice-preserved application network usage status. The slice-preserved application network usage status is that the application needs to be continuously provided with a slice service after the current card is switched to the target card to be transferred to. If all applications need to be provided with a slice service after the current card is switched to the target card to be transferred to, on one hand, it is difficult to match the slices of all applications; on the other hand, the workload of switching the slices of all applications is huge. Therefore, by determining according to the application operation status of the application that the application network usage status is the slice-preserved application network usage status and then obtaining the switchable slice according to the slice-preserved application network usage status and the slice database, some unimportant applications can be filtered out to decrease the number of slices provided, while maintaining the quality of slice service after the current card is switched to the target card to be transferred to.

Figure 5:
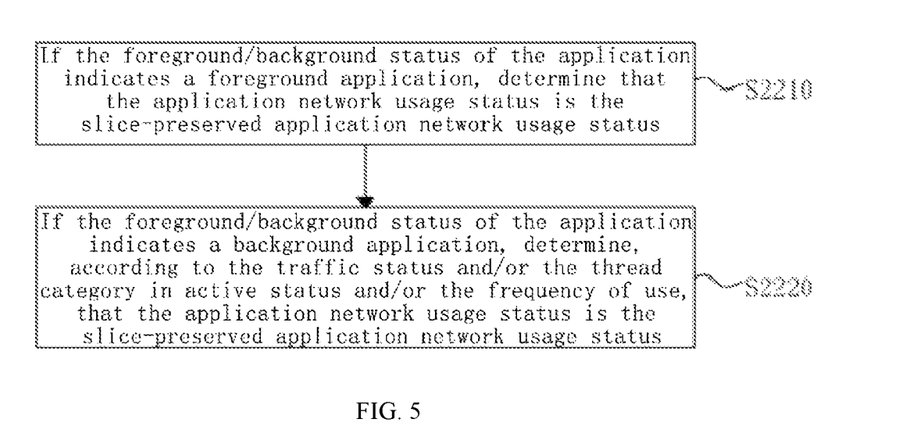
FIG. 5 is a flowchart of a card-transfer slice switching method according to another embodiment of the present disclosure.

In some embodiments, with reference to FIG. 5, S2220 may include the following steps S2210 to S2220.

At S2210, if the foreground/background status of the application indicates a foreground application, the application network usage status is the slice-preserved application network usage status.

At S2220, if the foreground/background status of the application indicates a background application, it is determined, according to the traffic status and/or the thread category in active status and/or the frequency of use, that the application network usage status is the slice-preserved application network usage status.

By analyzing the foreground/background status of the application, it is determined that the foreground/background status of the application indicates a foreground application or a background application. For the foreground application, the slice used by the foreground application needs to be preserved, such that the background application can be continuously provided with the slice service after the current card is switched to the target card to be transferred to. For the background application, it is determined, according to the traffic status and/or the thread category in active status and/or the frequency of use of the application, whether the slice used by the background application needs to be preserved, and then it is determined whether the background application needs to be continuously provided with the slice service after the current card is switched to the target card to be transferred to.

By determining the foreground/background status of the application, it is determined whether the application needs to be continuously provided with the slice service after the current card is switched to the target card to be transferred to, such that a high quality of slice service can be maintained for important applications and the efficiency of slice switching can be improved.

Figure 6:
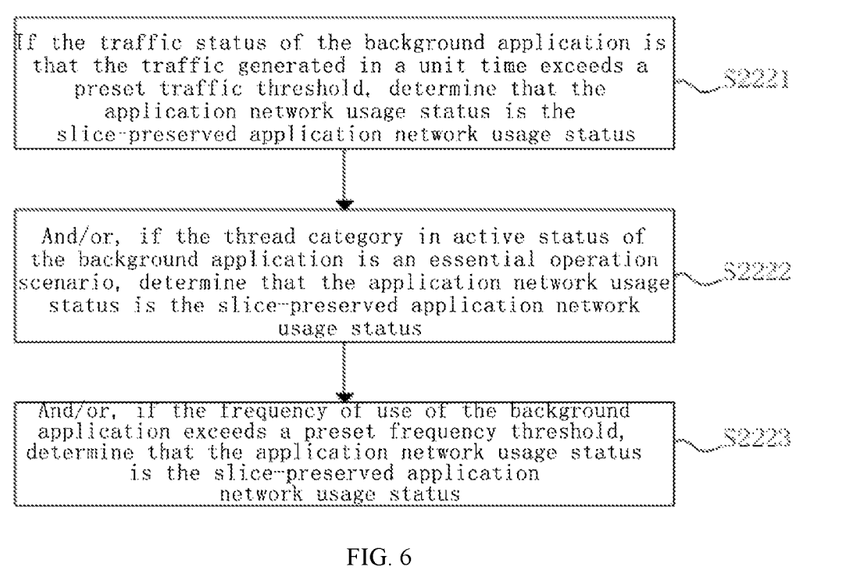
FIG. 6 is a flowchart of a card-transfer slice switching method according to another embodiment of the present disclosure.

In some embodiments, with reference to FIG. 6, S2220 may include the following steps S2221 to S2223.

At S2221, if the traffic status of the background application is that the traffic generated in a unit time exceeds a preset traffic threshold, the application network usage status is the slice-preserved application network usage status.

At S2222, and/or, if the thread category in active status of the background application is an essential operation scenario, the application network usage status is the slice-preserved application network usage status.

At S2223, and/or, if the frequency of use of the background application exceeds a preset frequency threshold, the application network usage status is the slice-preserved application network usage status.

With regard to the preset traffic threshold, different preset traffic thresholds may be set according to different background applications. For example, video background applications consume more traffic while reading background applications or Short Message Service (SMS) background applications consume less traffic, so different preset traffic thresholds are set according to different background applications. By determining whether the traffic generated by the background application in a unit time exceeds the preset traffic threshold, the importance of the background application to the user is determined. If the traffic status of the background application is that the traffic generated in the unit time exceeds the preset traffic threshold, the application network usage status is the slice-preserved application network usage status. That is, the slice service used by the background application needs to be continuously provided after the current card is switched to the target card to be transferred to. If the traffic status of the background application is that the traffic generated in the unit time does not exceed the preset traffic threshold, the application network usage status is a slice-unpreserved application network usage status. That is, the background application does not need to be provided with the slice service after the current card is switched to the target card to be transferred to.

When the thread category in active status is an essential operation scenario, for example a download thread and a payment thread which are default essential operation scenarios, the essential operation scenario may be preset according to actual needs, such that for different applications, the activities of application components are preset as essential operation scenarios. Once it is monitored that the current application component of the background application is preset, it is considered that the thread category in active status of the background application is an essential operation scenario. Thus, in view of thread category in active status of the background application being an essential operation scenario, the application network usage status is the slice-preserved application network usage status. That is, the slice service used by the background application needs to be continuously provided after the current card is switched to the target card to be transferred to. If it is detected that the thread category in active status of the application is a non-essential operation scenario, the application network usage status is a slice-unpreserved application network usage status. That is, the background application does not need to be provided with the slice service after the current card is switched to the target card to be transferred to.

By determining whether the frequency of use of the background application exceeds a preset frequency threshold, it is determined whether the application network usage status is the slice-preserved application network usage status or a slice-unpreserved application network usage status. The preset frequency threshold may be set by the user, or may be determined according to an average of frequencies of all background applications being called. In an embodiment, in a period of time, it is determined whether the frequency of use of the background application exceeds the preset frequency threshold. If the frequency of use of the background application in a period of time exceeds the preset frequency threshold, it indicates that the background application is an application frequently used by the user, and the application network usage status is the slice-preserved application network usage status. That is, the slice service used by the background application needs to be continuously provided after the current card is switched to the target card to be transferred to. If the frequency of use of the background application in a period of time does not exceed the preset frequency threshold, the application network usage status is a slice-unpreserved application network usage status. That is, the slice service of the background application does not need to be provided after the current card is switched to the target card to be transferred to.

Since the traffic status and/or the thread category in active status and/or the frequency of use can represent the importance of the background application to the user, it can be determined whether the application network usage status is the slice-preserved application network usage status by judging the traffic status and/or the thread category in active status and/or the frequency of use, and it is then determined whether the background application needs to be continuously provided with the slice service after the current card is switched to the target card to be transferred to. Thus, a background application that is important to the user is continuously provided with the slice service, to allow the user to continuously use this background application after the current card is switched to the target card to be transferred to. For a background application that is unimportant to the user, after the current card is switched to the target card to be transferred to, the slice service is not provided for the background application. Therefore, the running space of the terminal device can be reduced and the efficiency of slice switching can be improved.

Figure 7:
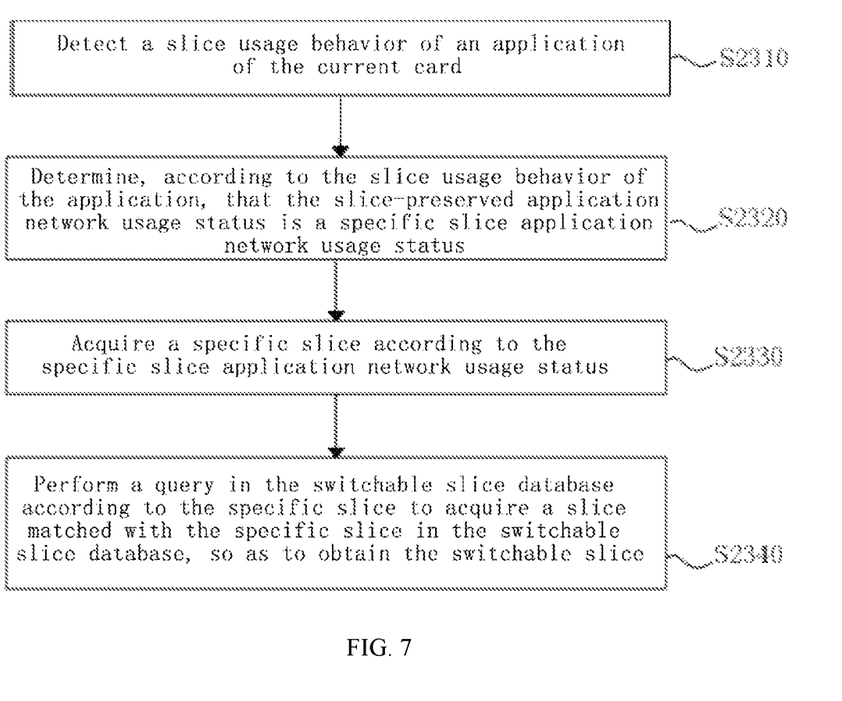
FIG. 7 is a flowchart of a card-transfer slice switching method according to another embodiment of the present disclosure.

In some embodiments, with reference to FIG. 7, the slice database includes a switchable slice database, and S2300 may include the following steps S2310 to S2340.

At S2310, a slice usage behavior of an application of the current card is detected.

At S2320, it is determined according to the slice usage behavior of the application that the slice-preserved application network usage status is a specific slice application network usage status.

At S2330, a specific slice is acquired according to the specific slice application network usage status.

At S2340, a query is performed in the switchable slice database according to the specific slice to acquire a slice matched with the specific slice in the switchable slice database, so as to obtain the switchable slice.

When the slice database includes a switchable slice database, it is determined according to the slice usage behavior of the application that the slice-preserved application network usage status is a specific slice application network usage status. For the specific slice application network usage status, it is considered that the slice service used by the application remains unchanged after the current card is switched to the target card to be transferred to. Thus, a specific slice is acquired according to the specific slice application network usage status, and the specific slice is queried in the switchable slice database. If there is a slice matched with the specific slice in the switchable slice database, this slice is acquired to obtain the switchable slice, so that it is convenient to perform card-transfer slice switching according to the switchable slice. Since the switchable slice data includes slices with a same traffic descriptor in the current card and the target card to be transferred to, a slice matched with the specific slice is acquired from the switchable slice database to obtain the switchable slice, so that the quality of slice service of the application is improved after the current card is switched to the target card to be transferred to.

Figure 8:
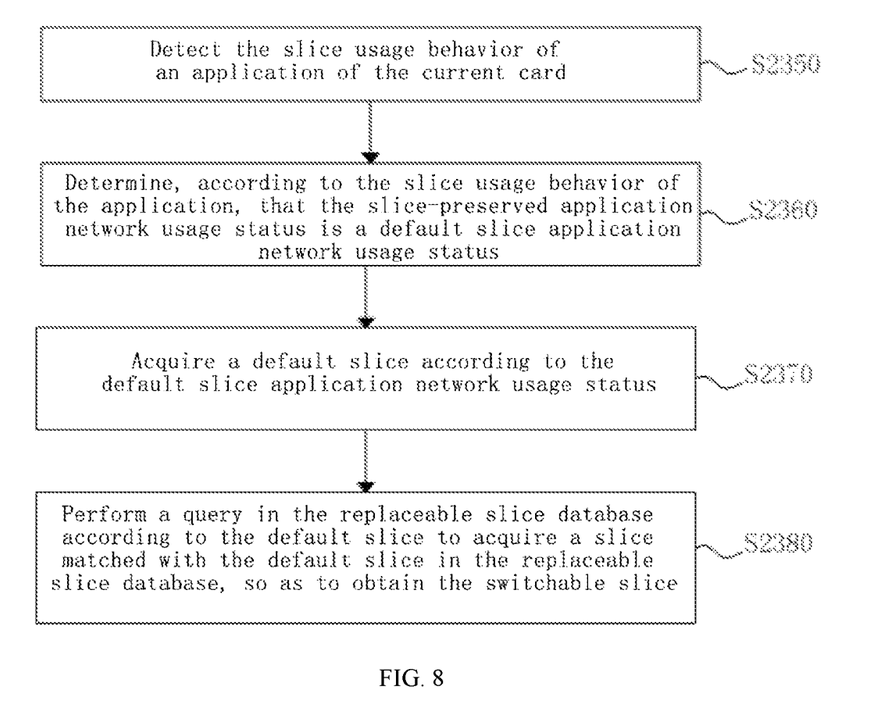
FIG. 8 is a flowchart of a card-transfer slice switching method according to another embodiment of the present disclosure.

In some embodiments, with reference to FIG. 8, the slice database includes a replaceable slice database, and S2300 includes the following steps S2350 to S2380.

At S2350, the slice usage behavior of an application of the current card is detected.

At S2360, it is determined, according to the slice usage behavior of the application, that the slice-preserved application network usage status is a default slice application network usage status.

At S2370, a default slice is acquired according to the default slice application network usage status.

At S2380, a query is performed in the replaceable slice database according to the default slice to acquire a slice matched with the default slice in the replaceable slice database, so as to obtain the switchable slice.

The slice usage behavior of the application of the current card is detected, and it is determined, according to the slice usage behavior of the application, that the slice-preserved application network usage status is a default slice application network usage status. For the default slice application network usage status, it is required that the slice used by the application does not affect the quality of service after the current card is switched to the target card to be transferred to. Thus, a default slice is acquired according to the default slice application network usage status, and a query is performed in the replaceable slice database according to the default slice to acquire a slice matched with the default slice in the replaceable slice database by utilizing the matching information, so as to obtain the switchable slice. By acquiring a slice matched with the default slice in the replaceable slice database to obtain the switchable slice, for an application having low requirements for the quality of slice service, after the current card is switched to the target card to be transferred to, the application can continuously use a slice with the same quality of service without being affected.

Figure 9:
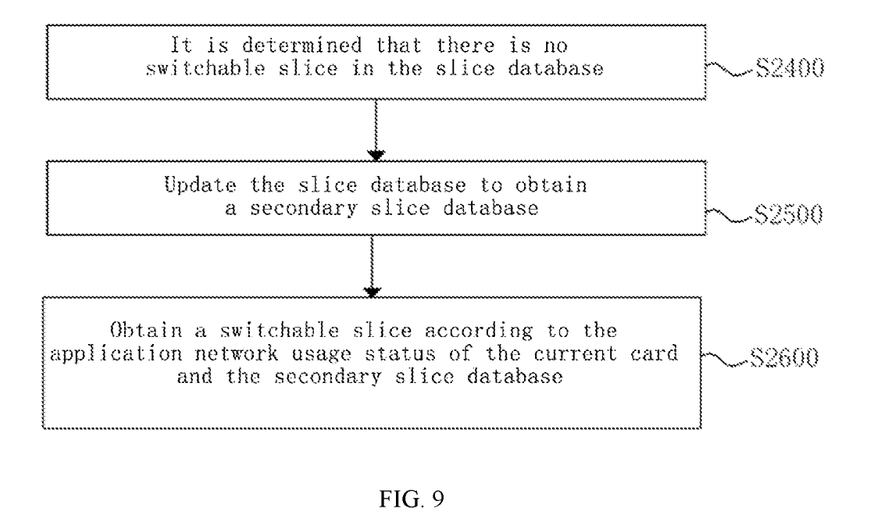
FIG. 9 is a flowchart of a card-transfer slice switching method according to another embodiment of the present disclosure.

In some embodiments, with reference to FIG. 9, S2000 further includes the following steps S2400 to S2600.

At S2400, it is determined that there is no switchable slice in the slice database.

At S2500, the slice database is updated to obtain a secondary slice database.

At S2600, a switchable slice is obtained according to the application network usage status of the current card and the secondary slice database.

If there is no switchable slice in the slice database, it indicates that the slice used by the application has no match in the slice database, and the quality of service of the service used by the application will be changed if slice switching is performed forcibly. Thus, the slice database is updated to obtain a secondary slice dataset, and a switchable slice is then obtained according to the application network usage status and the secondary slice database, such that the application can use a slice with the same quality.

In some embodiments, after the secondary slice database is obtained, it is determined according to the slice usage behavior of the application whether the slice-preserved application network usage status is a specific slice application network usage status or a default slice application network usage status. If the slice-preserved application network usage status is a specific slice application network usage status, a specific slice is acquired, and a query is performed in the secondary slice database according to the specific slice to acquire a slice matched with the specific slice, so as to obtain a switchable slice. Thus, it is convenient to query the specific slice used by the application from the updated secondary slice database, and the quality of service of the slice used by the application is improved. If the slice-preserved application network usage status is a default slice application network usage status, a default slice is acquired, and query is performed in the secondary slice database according to the default slice to acquire a slice matched with the default slice, so as to obtain a switchable slice, such that the application can still use the default slice with unchanged quality of slice service.

In an embodiment, the secondary slice database includes a secondary switchable slice database and a secondary replaceable slice database. If there is no slice matched with the specific slice in the switchable slice database and/or there is no slice matched with default slice in the replaceable slice database, the switchable slice database and the replaceable slice database are updated to form a secondary switchable slice database and a secondary replaceable slice database. Then, query is performed in the secondary switchable slice database and the secondary replaceable slice database according to the specific slice and the default slice to acquire a slice matched with the specific slice in the secondary switchable slice database and/or a slice matched with the default slice in the secondary replaceable slice database, so as to obtain a switchable slice.

If there is no slice matched with the specific slice in the switchable slice database and/or there is no slice matched with the default slice in the replaceable slice database, it is necessary to reacquire the slice set of the current card and the slice set of the target card to be transferred to, slices with a same traffic descriptor in the slice set of the current card and the slice set of the target card to be transferred to are reacquired to obtain a secondary switchable slice database, and slices with matched replacement parameters in the slice set of the current card and the slice set of the target card to be transferred to are reacquired to obtain a secondary replaceable slice database. After the secondary switchable slice database and the secondary replaceable slice database are obtained, the slice matched with the specific slice in the secondary switchable slice database and the slice matched with the default slice in the secondary replaceable slice database are acquired to obtain a switchable slice, so that it is convenient to perform card-transfer slice switching according to the switchable slice.

Figure 10:
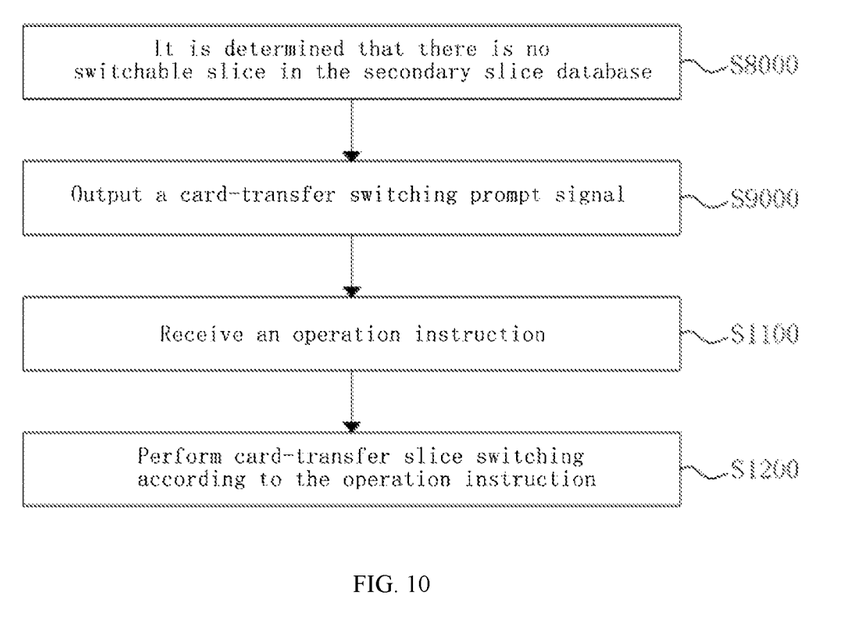
FIG. 10 is a flowchart of a card-transfer slice switching method according to another embodiment of the present disclosure.

In some embodiments, with reference to FIG. 10, the card-transfer slice switching method further includes the following steps S8000 to S1200.

At S8000, it is determined that there is no switchable slice in the secondary slice database.

At S9000, a card-transfer switching prompt signal is output.

At S1100, an operation instruction is received.

At S1200, card-transfer slice switching is performed according to the operation instruction.

In an embodiment, at S8000, it is determined that there is no slice matched with the specific slice in the secondary switchable slice database and/or there is no slice matched with default slice in the secondary replaceable slice database.

The card-transfer switching prompt signal is that "the current card is too poor in signal quality and needs to be switched to the target card to be transferred to, but the use of slice data by some applications will be affected". With the switching prompt signal, the user is prompted whether to perform slice switching. A list of applications with no matching slices is also output in the process of outputting the card-transfer switching prompt signal, so that the user can know which applications are affected after the current card is switched to the target card to be transferred to, and then determine whether to perform card-transfer switching. If the user agrees to switch the current card to the target card to be transferred to, an operation instruction input into the terminal device by the user will be received through a human-machine interaction device (e.g., a key, a touch screen, etc.), and card-transfer slice switching is performed according to the operation instruction. If the user rejects performing card-transfer switching, a rejection instruction will be received through the human-machine interaction device (e.g., a key, a touch screen, etc.), and the switching of the current card to the target card to be transferred to is stopped according to the rejection instruction.

In sum, after the current card and the target card to be transferred to have completed network registration, the slice set of the current card and the slice set of the target card to be transferred to are acquired. The matching information between slices with matched traffic descriptors in the slice set of the current card and the slice set of the target card to be transferred to is acquired to obtain a switchable slice database, the slices in the switchable slice database are removed from the slice sets of the current card and the target card to be transferred to, to obtain the remaining slices, and the slices with matched QoS parameters and/or bandwidth parameters and/or delay parameters are screened from the remaining slices to acquire the matching information between these slices so as to obtain a replaceable slice database. Monitoring and comparing the network quality of the current card and the network quality of the target card to be transferred to includes: monitoring and comparing at least one of the RSRP, RSRQ, SNR, bandwidth and network congestion of the current card and the target card to be transferred to. If the value of any one of the RSRP, RSRQ and SNR of the current card is less than a preset threshold or the bandwidth is too low to meet the quality of slice service or the network type is a non-5G network or a network congestion occurs, but the RSRP, RSRO or SNR of the target card to be transferred to is higher than that of the current card and the bandwidth and network type of the target card to be transferred to meet the quality of slice service, a card-transfer slice switching signal is output. The card-transfer slice switching signal is obtained to determine the foreground/background status of the application. If the foreground/background of the application is a foreground application, the application network usage status is the slice-preserved application network usage status, and the slice service needs to be continuously provided to the application after the current card is switched to the target card to be transferred to. If the foreground/background of the application is a background application and if the traffic status of the background application is that the traffic generated in a unit time exceeds a preset traffic threshold, the application network usage status is the slice-preserved application network usage status. Alternatively, if the thread category in active status of the background application is an essential operation scenario, the application network usage status is the slice-preserved application network usage status. Alternatively, if the frequency of use of the background application in a period of time exceeds a preset frequency threshold, the application network usage status is the slice-preserved application network usage status. For the slice-preserved application network usage status, the slice usage behavior of the current card is determined, and it is then determined according to the slice usage behavior of the application whether the slice-preserved application network usage status is a specific slice application network usage status or a default slice application network usage status. A specific slice is acquired according to the specific slice application network usage status, and a default slice is acquired according to the default slice application network usage status. Then, query is performed in the switchable slice database according to the specific slice and in the replaceable slice database according to the default slice, to obtain a slice matched with the specific slice in the switchable slice database and/or a slice matched with the default slice in the default slice database by utilizing the matching information, so as to obtain a switchable slice, such that card-transfer slice switching is performed according to the switchable slice. If there is no slice matched with the specific slice in the switchable slice database and/or there is no slice matched with the default slice in the replaceable slice database, the slices with the same traffic descriptor in the slice set of the current card and the slice set of the target card to be transferred to are reacquired to obtain a secondary switchable slice database, and the slices with matched replacement parameters in the slice set of the current card and the slice set of the target card to be transferred to are reacquired to obtain a secondary replaceable slice database. After the secondary switchable slice database and the secondary replaceable slice database are obtained, the slice matched with the specific slice in the secondary switchable slice database and the slice matched with the default slice in the secondary replaceable slice database are acquired to obtain a switchable slice, such that card-transfer slice switching is performed according to the switchable slice. If there is no slice matched with the specific slice in the secondary switchable slice database and/or there is no slice matched with the default slice in the secondary replaceable slice database, a card-transfer switching prompt signal is output. If the user agrees to switch the current card to the target card to be transferred to, an operation instruction is received, and card-transfer slice switching is performed according to the operation instruction.

Figure 11:
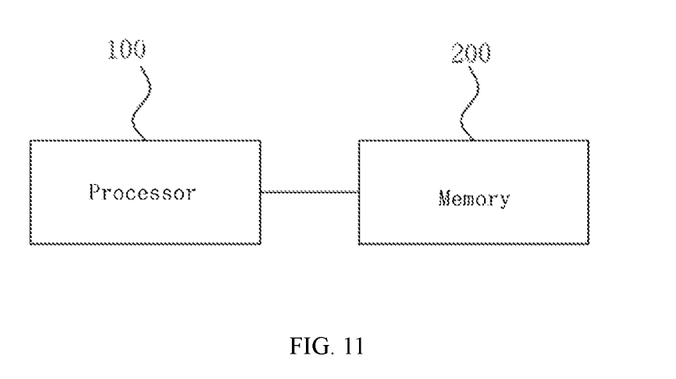
FIG. 11 is a schematic structural diagram of an electronic device according to another embodiment of the present disclosure.

In another aspect, with reference to FIG. 11, another embodiment of the present disclosure further provides an electronic device. The device includes: a memory 200, a processor 100 and a computer program stored on the memory 200 and executable by the processor 100 which, when executed by the processor 100, causes the processor 100 to implement the card-transfer slice switching method described above.

The electronic device may be a mobile terminal device or a non-mobile terminal device. The mobile terminal device may be a mobile phone, a tablet computer, a notebook computer, a palmtop computer, a vehicle-mounted terminal device, a wearable device, a super mobile personal computer, a netbook, a personal digital assistant, a CPE, a UF1 (Wireless Hotspot Device), and the like. The non-mobile terminal device may be a personal computer, a TV set, a teller machine, a self-service machine, and the like, which will not be specifically limited in the implementations of the present disclosure.

The memory 200 may be an external memory or an internal memory. The external memory is an external memory card, e.g., a Micro SD card. The external memory card communicates with the processor through an external memory interface to realize a data storage function. For example, music, video or other files are stored in the external memory card. The internal memory may be configured to store computer-executable program codes. The computer-executable program codes include instructions.

The processor 100 may include at least one processing units. For example, the processor 100 may include an Application Processor (AP), a modem processor, a Graphics Processing Unit (GPU), an Image Signal Processor (ISP), a controller, a video codec, a Digital Signal Processor (DSP), a baseband processor, and/or a Neural-Network Processing Unit (NPU), and the like. Different processing units may be separate devices or may be integrated in at least one processors. In some embodiments, the processor 100 executes the card-transfer slice switching method described in steps S1000 to S3000; or, the card-transfer slice switching method described in the steps S4000, S5000 and S1000 to S3000; or, the card-transfer slice switching method described in the steps S6000, S7000 and S1000 to S3000; or, the card-transfer slice switching method described in the steps S1000, S2100 to S2300 and S3000; or, the card-transfer slice switching method described in the steps S1000, S2100, S2210, S2220, S2300 and S3000; or, the card-transfer slice switching method described in the steps S1000, S2100, S2221 to S2223, S2220, S2300 and S3000; or, the card-transfer slice switching method described in the steps S1000, S2100, S2200, S2310 to S2340 and S3000; or, the card-transfer slice switching method described in the steps S1000, S2100, S2200, S2350 to S2380 and S3000; or, the card-transfer slice switching method described in the steps S1000, S2400 to S2600 and S3000; or, the card-transfer slice switching method described in the steps S1000, S2000, S3000 and S8000 to S1200.

In another aspect, an embodiment of the present disclosure provides a computer-readable storage medium, storing a computer-executable instruction which is used for performing the card-transfer slice switching method described above.

In some embodiments, the computer-executable instruction stored in computer-readable storage medium is used for performing the card-transfer slice switching method described in the steps S1000 to S3000; or, the card-transfer slice switching method described in the steps S4000, S5000 and S1000 to S3000; or, the card-transfer slice switching method described in the steps S6000, S7000 and S1000 to S3000; or, the card-transfer slice switching method described in the steps S1000, S2100 to S2300 and S3000; or, the card-transfer slice switching method described in the steps S1000, S2100, S2210, S2220, S2300 and S3000; or, the card-transfer slice switching method described in the steps S1000, S2100, S2221 to S2223, S2220, S2300 and S3000; or, the card-transfer slice switching method described in the steps S1000, S2100, S2200, S2310 to S2340 and S3000; or, the card-transfer slice switching method described in the steps S1000, S2100, S2200, S2350 to S2380 and S3000; or, the card-transfer slice switching method described in the steps S1000, S2400 to S2600 and S3000; or, the card-transfer slice switching method described in the steps S1000, S2000, S3000 and S8000 to S1200.

In the embodiments of the present disclosure, a switchable slice is obtained according to a card-transfer slice switching signal, an application network usage status of a current card and a preset slice database, and card-transfer slice switching is performed according to the switchable slice. Thus, the slice switching from one card to another card is realized without affecting the use of the application by the user, and the slice connection service quality is improved.

The apparatus embodiments described above are only illustrative. The units described as separate components may be or may not be physically separated from each other, that is, they may be located in one place or may be distributed on multiple network units. Some or all of the modules may be selected according to actual needs to achieve the objectives of the schemes of the embodiments.

It should be understood by a person having ordinary skills in the art that all or some of the steps in the methods disclosed above and the systems disclosed above may be implemented as software, firmware, hardware and suitable combinations thereof. Some or all of the physical components may be implemented as software executed by processors such as central processors, digital signal processors or microprocessors, or implemented as hardware, or implemented as integrated circuits such as application-specific integrated circuits. Such software may be distributed on computer-readable mediums, and the computer-readable mediums may include computer storage mediums (or non-temporary mediums) and communication mediums (or temporary mediums). As is well-known to those having ordinary skills in the art, the term "computer storage medium" includes volatile or non-volatile and removable or non-removable mediums implemented in any method or technology used to store information (such as computer-readable instructions, data structures, program modules or other data). The computer storage medium may include, but not limited to, RAMs, ROMs, EEPROMs, flash memories and other memory technologies, CD-RMs, digital versatile disks (DVDs) or other optical disk storages, magnetic cassettes, magnetic tapes, magnetic disk storages or other magnetic storage devices, or any other mediums that can be used to store desired information and can be accessed by computers. In addition, as is well-known to those having ordinary skills in the art, the communication medium generally contains computer-readable instructions, data structures, program modules or other data in modulation data signals such as carriers or other transmission mechanisms, and may include any information transfer medium.

Although some implementations of the present disclosure have been specifically described above, the present disclosure is not limited to the above implementations. Those having ordinary skills in the art may make various equivalent variations or replacements without departing from the scope of the present disclosure, and these equivalent variations or replacements shall fall into the scope defined by the appended claims of the present disclosure.

What is claimed is:

1. A card-transfer slice switching method, comprising:
acquiring a card-transfer slice switching signal;
obtaining a switchable slice according to the card-transfer slice switching signal, an application network usage status of a current card and a preset slice database, wherein the application network usage status comprises a slice-preserved application network usage status indicating that an application needs to be provided with a slice service after the current card is switched to a target card and a slice-unpreserved application network usage status indicating that the application does not need to be provided with the slice service after the current card is switched to the target card, wherein the slice database comprises matching information between the application network usage status and the switchable slice of the target card to be transferred to; and
performing card-transfer slice switching according to the switchable slice.

2. The card-transfer slice switching method of claim 1, further comprising:
monitoring and comparing a network quality of the current card and a network quality of the target card to be transferred to; and
in response to the target card to be transferred to having a better network quality than the current card, outputting the card-transfer slice switching signal.

3. The card-transfer slice switching method of claim 2, wherein the network quality comprises at least one of a reference signal received power, a reference signal received quality, a signal-to-noise ratio, a bandwidth, a network type and a network congestion.

4. The card-transfer slice switching method of claim 1, wherein the slice database comprises:
a switchable slice database, comprising matching information between slices with a same traffic descriptor in the current card and the target card to be transferred to; and/or,
a replaceable slice database, comprising matching information between slices with matched replacement parameters in the current card and the target card to be transferred to.

5. The card-transfer slice switching method of claim 4, wherein the replacement parameter comprises at least one of a Quality of Service (QoS) parameter, a bandwidth parameter and a latency parameter.

6. The card-transfer slice switching method of claim 4, further comprising:
acquiring a slice change signal; and
updating the switchable slice database and/or the replaceable slice database according to the slice change signal.

7. The card-transfer slice switching method of claim 4, wherein
obtaining a switchable slice according to the card-transfer slice switching signal, an application network usage status of a current card and a preset slice database comprises:
acquiring an application operation status of an application, wherein the application operation status comprises at least one of a foreground/background status, a traffic status, a thread category in active status, and a frequency of use;
determining, according to the application operation status of the application, that the application network usage status is the slice-preserved application network usage status; and obtaining the switchable slice according to the slice-preserved application network usage status and the slice database.

8. The card-transfer slice switching method of claim 7, wherein determining, according to the application operation status of the application, that the application network usage status is the slice-preserved application network usage status comprises:
in response to the foreground/background status of the application indicating a foreground application, determining that the application network usage status is the slice-preserved application network usage status; and
in response to the foreground/background status of the application indicating a background application, determining, according to the traffic status and/or the thread category in active status and/or the frequency of use, that the application network usage status is the slice-preserved application network usage status.

9. The card-transfer slice switching method of claim 8, wherein determining, according to the traffic status and/or the thread category in active status and/or the frequency of use, that the application network usage status is the slice-preserved application network usage status comprises:
in response to the traffic status of the background application being that the traffic generated in a unit time exceeds a preset traffic threshold, determining that the application network usage status is the slice-preserved application network usage status; and/or,
in response to the thread category in active status of the background application being an essential operation scenario, determining that the application network usage status is the slice-preserved application network usage status; and/or,
in response to the frequency of use of the background application exceeding a preset frequency threshold, determining that the application network usage status is the slice-preserved application network usage status.

10. The card-transfer slice switching method of claim 7, wherein the slice database comprises a switchable slice database, and obtaining the switchable slice according to the slice-preserved application network usage status and the slice database comprises:
detecting a slice usage behavior of an application of the current card;
determining, according to the slice usage behavior of the application, that the slice-preserved application network usage status is a specific slice application network usage status;
acquiring a specific slice according to the specific slice application network usage status; and
performing a query in the switchable slice database according to the specific slice to acquire a slice matched with the specific slice in the switchable slice database, so as to obtain the switchable slice.

11. The card-transfer slice switching method of claim 10, wherein the slice database comprises a replaceable slice database, and obtaining the switchable slice according to the slice-preserved application network usage status and the slice database comprises:
detecting the slice usage behavior of an application of the current card;
determining, according to the slice usage behavior of the application, that the slice-preserved application network usage status is a default slice application network usage status;
acquiring a default slice according to the default slice application network usage status; and
performing a query in the replaceable slice database according to the default slice to acquire a slice matched with the default slice in the replaceable slice database, so as to obtain the switchable slice.

12. The card-transfer slice switching method of claim 1, wherein obtaining a switchable slice according to the card-transfer slice switching signal, an application network usage status of a current card and a preset slice database comprises:
in response to an absence of the switchable slice in the slice database,
updating the slice database to obtain a secondary slice database; and
obtaining the switchable slice according to the application network usage status of the current card and the secondary slice database.

13. The card-transfer slice switching method of claim 12, wherein performing card-transfer slice switching according to the switchable slice comprises:
in response to an absence of the switchable slice in the secondary slice database,
outputting a card-transfer switching prompt signal;
receiving an operation instruction; and
performing card-transfer slice switching according to the operation instruction.

14. An electronic device, comprising: a memory, a processor, and a computer program stored on the memory and executable by the processor which, when executed by the processor, causes the processor to perform a card-transfer slice switching method comprising:
acquiring a card-transfer slice switching signal;
obtaining a switchable slice according to the card-transfer slice switching signal, an application network usage status of a current card and a preset slice database, wherein the application network usage status comprises a slice-preserved application network usage status indicating that an application needs to be provided with a slice service after the current card is switched to a target card and a slice-unpreserved application network usage status indicating that the application does not need to be provided with the slice service after the current card is switched to the target card, wherein the slice database comprises matching information between the application network usage status and the switchable slice of the target card to be transferred to; and
performing card-transfer slice switching according to the switchable slice.

15. A non-transitory computer-readable storage medium, storing a computer-executable instruction which, when executed by a processor, causes the processor to perform a card-transfer slice switching method comprising:
acquiring a card-transfer slice switching signal;
obtaining a switchable slice according to the card-transfer slice switching signal, an application network usage status of a current card and a preset slice database, wherein the application network usage status comprises a slice-preserved application network usage status indicating that an application needs to be provided with a slice service after the current card is switched to a target card and a slice-unpreserved application network usage status indicating that the application does not need to be provided with the slice service after the current card is switched to the target card, wherein the slice database comprises matching information between the application network usage status and the switchable slice of the target card to be transferred to; and
performing card-transfer slice switching according to the switchable slice.

16. The non-transitory computer-readable storage medium of claim 15, wherein the slice database comprises:
- a switchable slice database, comprising matching information between slices with a same traffic descriptor in the current card and the target card to be transferred to; and/or,
- a replaceable slice database, comprising matching information between slices with matched replacement parameters in the current card and the target card to be transferred to.

17. The non-transitory computer-readable storage medium of claim 16, wherein
obtaining a switchable slice according to the card-transfer slice switching signal, an application network usage status of a current card and a preset slice database comprises:
- acquiring an application operation status of an application, wherein the application operation status comprises at least one of a foreground/background status, a traffic status, a thread category in active status, and a frequency of use;
- determining, according to the application operation status of the application, that the application network usage status is the slice-preserved application network usage status; and
- obtaining the switchable slice according to the slice-preserved application network usage status and the slice database.

18. The non-transitory computer-readable storage medium of claim 17, wherein determining, according to the application operation status of the application, that the application network usage status is the slice-preserved application network usage status comprises:
- in response to the foreground/background status of the application indicating a foreground application, determining that the application network usage status is the slice-preserved application network usage status; and
- in response to the foreground/background status of the application indicating a background application, determining, according to the traffic status and/or the thread category in active status and/or the frequency of use, that the application network usage status is the slice-preserved application network usage status.

19. The non-transitory computer-readable storage medium of claim 18, wherein determining, according to the traffic status and/or the thread category in active status and/or the frequency of use, that the application network usage status is the slice-preserved application network usage status comprises:
- in response to the traffic status of the background application being that the traffic generated in a unit time exceeds a preset traffic threshold, determining that the application network usage status is the slice-preserved application network usage status;
- and/or, in response to the thread category in active status of the background application being an essential operation scenario, determining that the application network usage status is the slice-preserved application network usage status;
- and/or, in response to the frequency of use of the background application exceeding a preset frequency threshold, determining that the application network usage status is the slice-preserved application network usage status.

20. The non-transitory computer-readable storage medium of claim 17, wherein the slice database comprises a switchable slice database, and obtaining the switchable slice according to the slice-preserved application network usage status and the slice database comprises:
- detecting a slice usage behavior of an application of the current card;
- determining, according to the slice usage behavior of the application, that the slice-preserved application network usage status is a specific slice application network usage status;
- acquiring a specific slice according to the specific slice application network usage status; and
- performing a query in the switchable slice database according to the specific slice to acquire a slice matched with the specific slice in the switchable slice database, so as to obtain the switchable slice.

* * * * *